UNITED STATES PATENT OFFICE.

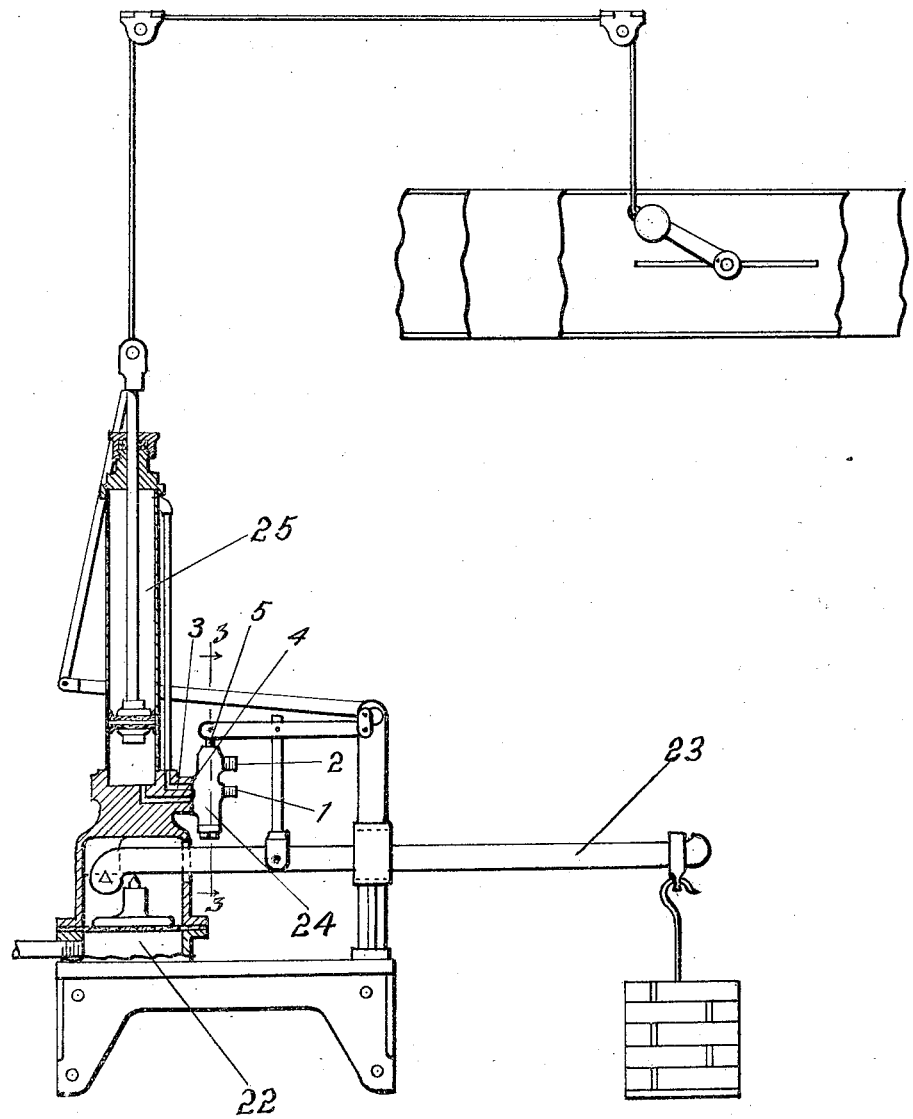

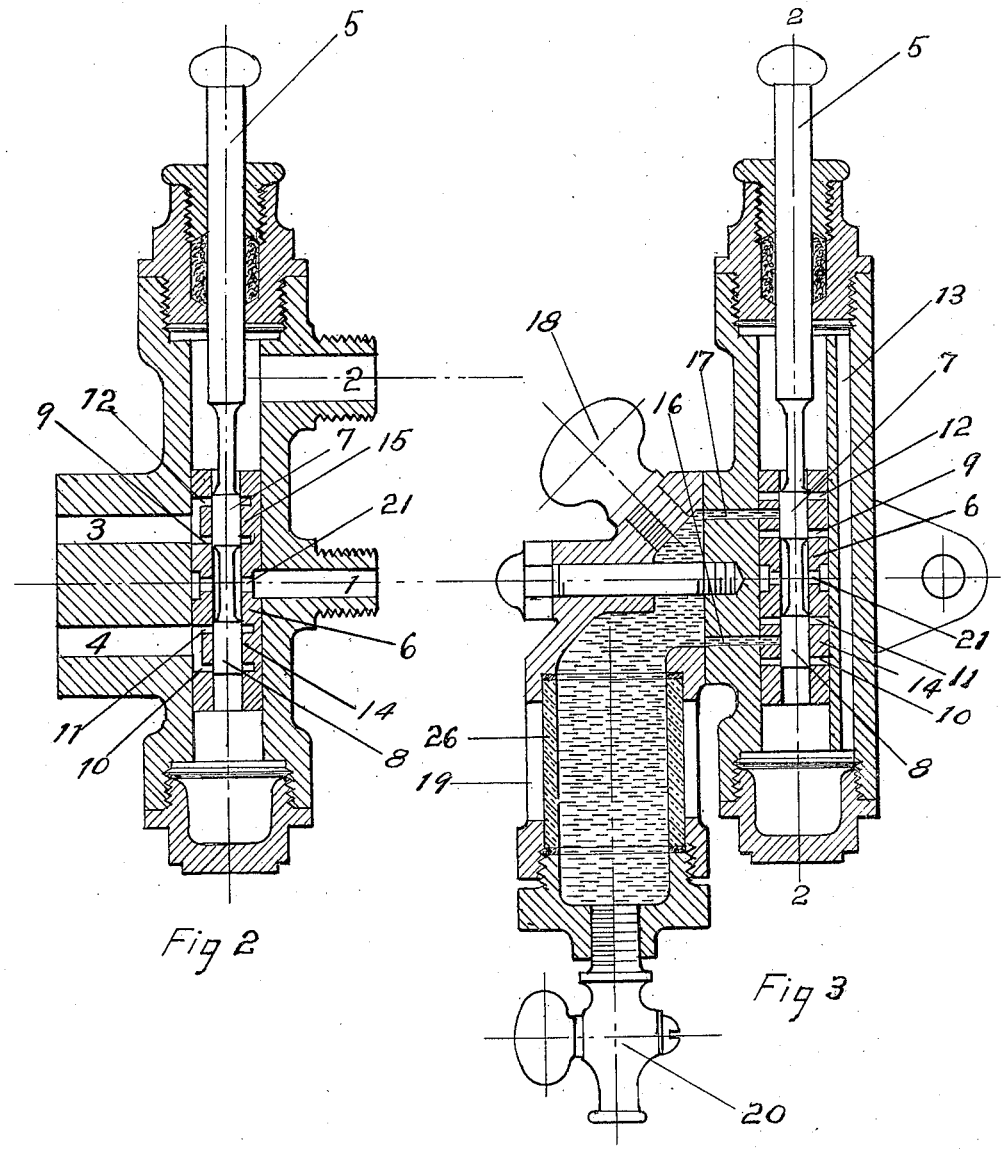

JAMES LEWIS KIMBALL, OF SALEM, MASSACHUSETTS, ASSIGNOR TO RUGGLES-KLINGEMANN CO., OF SALEM, MASSACHUSETTS.

LUBRICATING SYSTEM.

1,405,039.  Specification of Letters Patent.  Patented Jan. 31, 1922.

Application filed April 5, 1920. Serial No. 371,547.

*To all whom it may concern:*

Be it known that I, JAMES LEWIS KIMBALL, a citizen of the United States, residing at Salem, in the county of Essex and State of Massachusetts, have invented certain new and useful Improvements in Lubricating Systems, of which the following is a specification.

My invention relates to lubricators and lubricating systems, and more particularly to devices and systems for lubricating pistons that are adapted to reciprocate in the cylinders of valves, engines and the like. From a more specific aspect, the invention relates to lubricating systems for damper regulators of the pilot-operated type.

In the drawings, Fig. 1 is a view in elevation, partly in section, of a damper regulator shown for the purpose of illustrating my invention; Fig. 2 is a vertical section taken upon the line 2—2 of Fig. 3, illustrating a preferred embodiment of the invention; and Fig. 3 is a vertical section taken upon the line 3—3 of Fig. 1, looking in the direction of the arrows.

Like numerals refer to similar parts in the various views.

My invention is described herein in connection with the lubrication of a controlling or pilot valve for the damper-operating fluid motor of a damper regulator. A diaphragm or pressure chamber (22), weighted scale beam (23), pilot valve (24) and motor (25) constitute necessary elements of a hydraulic damper regulator.

It will be understood that where there are no means of lubricating the stem of the pilot valve (24), friction soon develops, due to corrosion, which results in destroying the sensitiveness of the regulator to respond to slight changes in pressure, allowing the motor to travel past the point where it should have stopped, resulting in a wide range of furnace temperature and decreased boiler efficiency.

The object of the present invention, accordingly, is to provide improved means for lubricating valves and similar mechanisms, thereby to reduce friction and prevent corrosion.

To this end, a feature of the invention resides in the combination of a motor and a controlling valve therefor, with novel means for lubricating the valve without lubricating the motor. Another feature of the invention contemplates the provision of a novel lubricating system of general application.

With the above object in view, the invention consists of the improved lubricating system hereinafter described, illustrated in the accompanying drawings and defined in the appended claims.

The invention will now be explained in connection with the accompanying drawings, in which the inlet for water or other fluids under pressure is indicated by the numeral (1). (2) is the waste or overflow. (3) is a passage leading to the top of the motor. (4) is a passage leading to the bottom of the motor. (5) is the valve stem, which has cylindrical portions (7) and (8), which control the admission and exhaust to opposite ends of the motor, this stem being shown in a neutral position in which no water can be admitted or exhausted to or from the motor cylinder. (6) is a valve bushing having an inlet (21) which admits pressure between the two cylindrical portions (7) and (8) of valve stem (5). When the stem is raised, water is admitted at port (9) and communicates through passage (3) to the top of the motor; at the same time exhaust port (10) is opened to the atmosphere, allowing water to escape from the bottom end of the motor; and when the stem is lowered, admission port (9) and exhaust port (10) are closed and admission port (11) and exhaust port (12) are opened, reversing the motion of the motor. The exhaust and the admission ports are preferably provided in the bushing, as shown.

It will be understood that any pressure escaping from the bottom end of the motor will be exhausted through port (13), Figure (3), to the top of the pilot valve, where it will go to waste, through over-flow connection (2).

Attached to the valve is a closed receptacle (19) containing oil or other lubricating compounds. (16) and (17) are ports leading from the receptacle to the valve spindle (5). Between the exhaust and admission ports, the valve bushing (6) has guide bearings (14) and (15) which it is desired to lubricate. The cylindrical portions (7) and (8) of the stem are closely fitted to these bearings, allowing a slow leak of water to pass through additional ports or openings (16) and (17) that lead from and connect the receptacle to the respective guide bearings. The water, being heavier than the oil, settles to the bottom of the receptacle (19). This, in itself, would not be sufficient to lubricate the stem as the globules of water formed through their capillary attraction in the ports (16) and (17) would be sufficient to hold back the oil in these small passages and prevent it reaching the valve stem.

In the novel arrangement of this valve, a forced lubrication to the guide bearings takes place, as it will be noted that when the stem (5) is raised, guide bearing (15) is surrounded by pressure, while guide bearing (14) is open to the atmosphere, and in this way a small amount of water will leak past the cylindrical portion (7) of the stem and enter the oil receptacle (19) through port (17) and settle by gravitation to the bottom of the receptacle; and at the same time, a small amount of oil will be forced or expelled through port (16) and lubricate the cylindrical portion (8) of the valve stem.

When the stem is lowered, the bottom bearing (14) is subjected to pressure and the top bearing (15) is open to the atmosphere, allowing a slow leak of water to enter the receptacle through port (16) and feed oil to the cylindrical portion (7) of the valve stem (5) and in this way alternately lubricate the fitted portions (7) and (8) of the valve stem. The ends of the cylindrical portions (7) and (8) enter the guide bushing when subject to maximum travel in either direction and therefore supply lubricant to the entire length of the bearing.

A pet cock (20) is provided in the bottom of the receptacle for drawing away the water before filling with oil which is supplied at (18). A sight glass (26) is provided for determining the height of the oil in the receptacle (19).

I am well aware that soap and other lubricating and water softening compounds have been used to keep the pilot valve stem from sticking, but these compounds have been retained in receptacles installed in the water piping leading to the pilot valve and therefore not only lubricated the spindle, but the piping and walls of the motor, which was not necessary; besides, the volume of water to be softened is so great as to require a large amount of compound.

In my invention, the circulation of water is very slight and the lubricant is supplied to the exact point which it is desired to lubricate.

It will be understood that my invention is not restricted to the exact embodiment thereof that is illustrated and described herein, and that it is not confined to damper regulators, nor, even, in some of its broader features, to pressure systems. The novel lubricator of the present invention may, furthermore, be employed to lubricate other piston or spindle-containing mechanisms than valves, such as cylinder engines and the like, though the terms "valve" and "spindle" are retained throughout the following claims for the sake of consistency in terminology. With this understanding, the invention is to be regarded as described and illustrated by, but not limited to, the above specification and the accompanying drawings, and to be defined by the appended claims, construed as indicated above.

Having described my invention, what I claim as new and desire to secure by Letters Patent of the United States, is:—

1. In a valve having exhaust and admission ports and a spindle for controlling the ports, guide bearings between the exhaust and admission ports, a receptacle for containing lubricant attached to said valve, the valve having additional ports leading from said receptacle to the guide bearings, and means for alternately admitting water to said receptacle through one of said additional ports to expel lubricant at the other additional port, all as specified and for the purpose set forth.

2. The combination of a valve having exhaust and admission ports and a spindle for controlling the ports, a receptacle for containing lubricant, the valve having additional ports leading from said receptacle to the valve spindle, and means for alternately admitting water to said receptacle through each of the said ports to expel lubricant through the opposite port, as set forth and for the purpose described.

3. The combination of a valve having exhaust and admission ports and a spindle for controlling the ports, said spindle having cylindrical portions for controlling the admission and the exhaust, guide bearings between the admission and exhaust ports, and means for lubricating said guide bearings all as specified, and for the purpose set forth.

4. The combination with a motor and a valve for controlling the motor having two ports, of a lubricant-containing receptacle, and means whereby a fluid is adapted to be admitted from the valve to the receptacle by one port to displace lubricant in the receptacle, and whereby the displaced lubricant is adapted to be expelled by the displacing fluid from the receptacle to the valve by the other port.

5. The combination of a valve having a bushing provided with exhaust and admission ports, and a spindle slidably fitted to said bushing, said spindle having cylindrical portions for controlling the exhaust and admission ports in said bushing, guide bearings between the exhaust and admission ports, a receptacle for containing lubricant, the valve having additional ports leading from the receptacle to the guide bearings, and means effected by the movement of the spindle for admitting water through one of the additional ports to expel lubricant at the other additional port, all as substantially set forth and for the purpose described.

6. The combination of a motor for operating a steam-pressure-controlling damper, a pilot valve for operating the motor having exhaust and admission ports and a spindle, means effected by variations in the steam pressure for operating the spindle, the spindle being provided with cylindrical portions for controlling the exhaust and admission ports, guide bearings between the exhaust and admission ports, and means for lubricating said guide bearings for the purpose set forth.

7. The combination of a motor for operating a pressure-controlling damper, a pilot valve for operating the motor having exhaust and admission ports, a pressure device for operating the pilot valve, said pilot valve having a spindle slidably fitted therein having cylindrical portions for controlling the exhaust and admission of water through the ports to the motor, guide bearings between said exhaust and admission ports, a receptacle for containing lubricant, the valve having additional ports leading from said guide bearings to the receptacle, and means effected by the movement of the spindle to simultaneously admit water to one end of the motor and to the receptacle through one of the additional ports, and to exhaust water from the opposite end of the motor and to expel lubricant through the other additional port of the receptacle, for the purpose set forth.

8. In a valve, the combination with a valve stem and a bearing therefor having ported openings, and a receptacle containing a lubricant connected to said openings, a fluid being adapted to enter between the stem and the bearing and leak into the receptacle through said openings, of means whereby upon the entrance of the fluid through either opening lubricant is forced from the receptacle into the bearing through the other opening for the purpose set forth.

9. The combination of a motor, a pilot valve for operating the motor having a valve spindle and a bearing therefor provided with ported openings, and a receptacle containing a lubricant connected to said openings, water being adapted to enter between the stem and the bearing and leak into the receptacle through said openings, of means whereby upon the entrance of the water through either opening, lubricant is forced into the bearing through the other opening for the purpose set forth.

10. In a pressure system, the combination with a motor for controlling the pressure in the system and a valve for controlling the motor, of means whereby the pressure of the system is adapted to effect the lubrication of the valve.

11. In a pressure system, a motor for controlling the pressure in the system, a valve for controlling the motor having a valve spindle, a lubricant-containing receptacle, and means whereby the pressure of the system forces lubricant from the receptacle to the spindle.

12. A valve having, in combination, a valve spindle, a lubricant-containing receptacle, a bearing for the spindle having a plurality of openings connected to the receptacle, and means for forcing fluid under pressure through one of the openings into the receptacle to cause the flow of lubricant from the receptacle through another of the openings to the spindle.

13. In a pressure system, a valve having admission and exhaust ports for controlling the admission and the exhaust of an incompressible fluid under pressure, a lubricant-containing receptacle, and means whereby the pressure of the system forces the incompressible fluid into the receptacle at the admission port and simultaneously forces lubricant from the receptacle to the valve at the exhaust port.

14. In a pressure system, a valve spindle having cylindrical portions for controlling the admissions and the exhaust, a bearing for the spindle comprising a bushing and guide bearings, the cylindrical portions of the spindle being closely fitted to the guide bearings, and being adapted to enter the bushing, means whereby the pressure of the system is exerted upon one of the guide bearings when the other guide bearing is open to the exhaust, and a lubricant-containing receptacle, fluid being adapted to be forced under pressure into the receptacle at the first-named guide bearing to cause a flow of lubricant from the receptacle to the second-named guide bearing.

15. The combination with a motor, and a valve for controlling the motor, of means responsive to the movement of the valve for lubricating the valve.

16. The combination with a valve, means for controlling the valve, and a fluid-operated motor for controlling the controlling means, of means whereby movement of the motor-operating fluid upon movement of the valve effects the lubrication of the valve.

17. A valve having, in combination, a valve spindle, a bearing for the spindle comprising a bushing and a guide bearing on each side of the bushing, and means for lubricating the guide bearings, the lubricant being adapted to be supplied by the movement of the spindle from the guide bearings to the bushing.

In testimony whereof I have affixed my signature, in presence of two witnesses.

JAMES LEWIS KIMBALL.

Witnesses:
LAURA V. DAVIS,
ANNA T. VENO.